United States Patent
Chevillard et al.

(10) Patent No.: US 8,168,112 B2
(45) Date of Patent: May 1, 2012

(54) BLOWN FILMS AND PROCESSES OF FORMING THE SAME

(75) Inventors: Cyril Chevillard, Dickinson, TX (US); Jay Nguyen, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 99 days.

(21) Appl. No.: 12/340,655

(22) Filed: Dec. 20, 2008

(65) Prior Publication Data

US 2010/0160570 A1    Jun. 24, 2010

(51) Int. Cl.
*C08F 8/06* (2006.01)
*B29C 49/00* (2006.01)

(52) U.S. Cl. ........ 264/454; 264/564; 264/565; 264/459; 525/192; 525/194; 525/333.8; 525/387; 526/348.1

(58) Field of Classification Search .................. 264/454, 264/564, 565, 459; 525/192, 194, 333.8, 525/387; 526/348.1
See application file for complete search history.

(56) References Cited

U.S. PATENT DOCUMENTS

| | | | |
|---|---|---|---|
| 6,632,884 B1 | 10/2003 | Skar | |
| 2004/0058803 A1* | 3/2004 | Knoeppel et al. | 502/103 |
| 2006/0178482 A1* | 8/2006 | Kwalk | 525/240 |
| 2007/0007681 A1* | 1/2007 | Chevillard et al. | 264/40.1 |
| 2008/0275197 A1 | 11/2008 | Coffy | |

* cited by examiner

*Primary Examiner* — Roberto Rabago

(57) ABSTRACT

Blown films and processes of forming the same are described herein. The processes generally include providing a bimodal ethylene based polymer, blending the bimodal ethylene based polymer with at least about 30 ppm peroxide to form modified polyethylene and forming the modified polyethylene into a blown film.

7 Claims, 1 Drawing Sheet

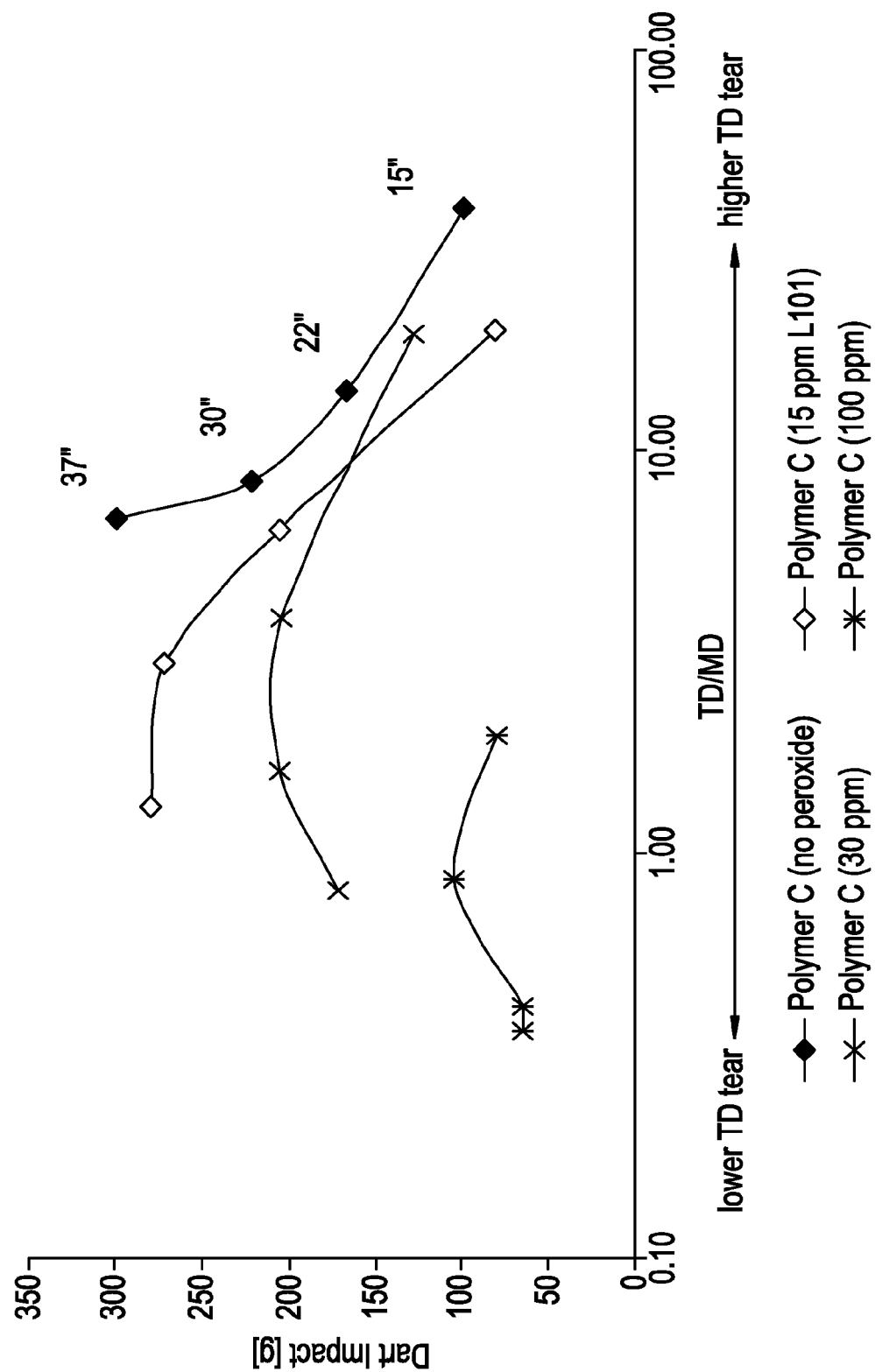

BLOWN FILMS AND PROCESSES OF FORMING THE SAME

FIELD

Embodiments of the present invention generally relate to articles formed with polyethylene. In particular, embodiments of the present invention generally relate to blown film articles formed with bimodal polyethylene.

BACKGROUND

As reflected in the patent literature, propylene polymers have been modified in a variety of applications, such as injection molding, rotomolding, blown film, extrusion and solid state stretching processes, for example, with demonstrated improvements in processing and the resulting article's properties. However, the modification of ethylene polymers (and in particular, the modification of ethylene polymers with peroxide) has generally not demonstrated the desired improvements in processing and formed article properties. Therefore, a need exists to develop ethylene based polymers and processes of forming polymer articles exhibiting improved processing and article properties.

SUMMARY

Embodiments of the present invention include processes of forming blown films. The processes generally include providing a bimodal ethylene based polymer, blending the bimodal ethylene based polymer with at least about 30 ppm peroxide to form modified polyethylene and forming the modified polyethylene into a blown film.

Embodiments of the invention further include blown films formed by the processes described herein.

BRIEF DESCRIPTION OF DRAWINGS

FIG. 1 illustrates the dart impact with respect to tear properties of various film samples.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments of the invention generally include blown films exhibiting improved bubble stability.

Catalyst Systems

Catalyst systems useful for polymerizing olefin monomers include any suitable catalyst system. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

One or more embodiments of the invention include Ziegler-Natta catalyst systems generally formed by contacting an alkyl magnesium compound with an alcohol to form a magnesium dialkoxide compound and then contacting the magnesium dialkoxide compound with successively stronger chlorinating agents. (See, U.S. Pat. Nos. 6,734,134 and 6,174,971, which are incorporated herein by reference.)

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. In one or more embodiments, the polymerization process includes the production of multi-modal polyolefins. As used herein, the term "multi-modal process" refers to a polymerization process including a plurality of reaction zones (e.g., at least two reaction zones) that produce a polymer exhibiting a multi-modal molecular weight distribution. As used herein, a single composition including a plurality of molecular weight peaks is considered to be a "bimodal" polyolefin. For example, a single composition including at least one identifiable high molecular weight fraction and at least one identifiable low molecular weight fraction is considered a "bimodal" polyolefin.

The multi-modal polyolefins may be formed via any suitable method, such as via a plurality of reactors in series. The reactors can include any reactors or combination of reactors, as described above. In one or more embodiments, the same catalyst is utilized in the plurality of reactors. In another embodiment, different catalysts are used in the plurality of reactors. In the preparation of bi-modal polymers, the high molecular weight fraction and the low molecular weight fraction can be prepared in any order in the reactors, e.g., the low molecular weight fraction may be formed in the first reactor and the high molecular weight fraction in the second reactor, or vise versa, for example.

Upon removal from the reactor, the polymer may be passed to a polymer recovery system for further processing, such as addition of additives and/or extrusion, for example.

The polymer may be blended with a modifier (i.e., "modification"), which may occur in the polymer recovery system or in another manner known to one skilled in the art. In one or more embodiments, the modifier is a peroxide. For example, the peroxide may include known peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate and combinations thereof, for example. In one or more embodiments, the peroxide includes an organic peroxide. For example, the organic peroxides may include L101, commercially available from Akzo Nobel Corp. and Triganox 301, commercially available from Arkema. Inc.

In one or more embodiments, the peroxide is blended with the modifier in an amount of greater than about 30 ppm, or from about 50 ppm to about 150 ppm or from about 75 ppm to about 125 ppm, for example.

It is contemplated that the polymer may be blended with additional modifiers, such as free radical initiators, including oxygen, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of tiling.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 Nt. % or at least about 90 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.97 g/cc, or from about 0.90 g/cc to about 0.97 g/cc or from about 0.925 g/cc to about 0.97 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

In one or more embodiments, the polymers include low density polyethylene. As used herein, the term "low density polyethylene" refers to ethylene based polymers having a density of from about less than about 0.92 g/cc, for example.

In one or more embodiments, the polymers include medium density polyethylene. As used herein, the term "medium density polyethylene" refers to ethylene based polymers having a density of from about 0.92 g/cc to about 0.94 g/cc or from about 0.926 g/cc to about 0.94 g/cc, foe example.

In one or more embodiments, the polymers include high density polyethylene. As used herein, the term "high density polyethylene" refers to ethylene based polymers having a density of from about 0.94 g/cc to about 0.97 g/cc, for example.

In one or more embodiments, the polymers include high molecular weight polyethylene. As used herein, the term "high molecular weight polyethylene" refers to ethylene based polymers having a molecular weight of from about 50,000 to about 10,000,000, for example.

In one or more embodiments, the ethylene based polymers may exhibit bimodal molecular weight distributions (i.e., they are bimodal polymers). For example, a single composition including two distinct molecular weight peaks using size exclusion chromatograph (SEC) is considered to be a "bimodal" polyolefin. For example, the molecular weight fractions may include a high molecular weight fraction and a low molecular weight fraction.

The high molecular weight fraction exhibits a molecular weight that is greater than the molecular weight of the low molecular weight fraction. The high molecular weight fraction may have a molecular weight of 7 from about 50,000 to about 10,000,000, or from about 60,000 to about 5,000,000 or from about 65,000 to about 1,000,000, for example. In contrast, the low molecular weight fraction may have a molecular weight of from about 500 to about 50,000, or from about 525 to about 40,000 or from about 600 to about 35,000, for example.

The bimodal polymers may have a ratio of high molecular weight fraction to low molecular weight fraction of from about 80:20 to about 20:80, or from about 70:30 to about 30:70 of from about 60:40 to about 40:60, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

One or more embodiments of the invention include utilizing the polymers to, form blown film, which may then be used to form blown film articles, such as sacks and liners, for example. Blown films may be formed by known processes, such as by forcing molten polymer through a circular die, which is then blown. The resultant bubble is then flattened and cut into strips, that when rolled, produces rolls of flat film.

Unfortunately, blown film processes may experience bubble instability. Bubble instability can include many phenomena, such as draw resonance (DR), generally characterized by a periodic oscillation of the bubble diameter, helicoidal instability, generally characterized by a helicoidal motion of bubble around its axial direction and frost line height (FLH) instability, generally characterized by variation in the location of FLH, for example.

More specifically, blown films formed with ethylene based polymers, and in particular high density ethylene based polymers, may exhibit bubble instability during processing, resulting in blown films having defects and/or processing difficulties. In addition, if the bubble instability is not reversed, the bubble may break, resulting in shut down of the processing line.

Prior attempts to improve bubble stability have included utilizing additives, such as calcium carbonate and fluoroelastomers, for example. However, such additives have not demonstrated consistent improvement in bubble stability and therefore have limited success depending upon the type of polymer utilized. Additionally, such additives have not demonstrated desired physical characteristics of the product formed from the process.

Therefore, attempts have been made to modify the ethylene based polymers with peroxide to improve bubble stability. However, attempts to modify ethylene polymers with peroxide have generally been limited to modification with low concentrations of peroxide (e.g., less than about 30 ppm). While limited success has been achieved by such modification, the ability to further improve processes and polymer article properties with higher levels of peroxide has been unattainable. However, embodiments of the invention (and in particular utilizing the bimodal ethylene based polymers described herein) have unexpectedly resulted in the ability to use larger concentrations of peroxide (e.g. greater than about 30 ppm) with the resulting benefits in bubble stability. For example, embodiments of the invention provide for at least about a 10%, or at least about 15%, or at least about 20% increase in bubble stability than a polymer article prepared via an identical process absent the peroxide. In addition, the embodiments of the invention provide for a stable blown film using larger concentrations of peroxide (e.g., greater than about 30 ppm) whereas, similar peroxide addition to other Ziegler-Natta bimodal ethylene based polymers results in an inability to blow film.

In addition, embodiments of the invention generally result in a reduction of transverse direction (TD) tear strength (as measured by ASTM D446) with little or no loss in dart impact resistance. For example, the TD tear strength may be from about 5 g to about 35 g, or from about 7 g to about 33 g or from about 10 g to about 30 g, for example. Unexpectedly, embodiments of the invention result in a blown film exhibiting a TD strength that is at least about 85%, or about 86% or about 90% lower than a polymer article prepared via an identical process absent the peroxide.

EXAMPLES

As used herein, Polymer "A" was a high molecular weight bimodal Ziegler-Natta formed high density polyethylene having a density of 0.951 g/cc, commercially available from TOTAL PETROCHEMICALS USA, Inc. as 2285.

As used herein, Polymer "B" was a high molecular weight bimodal Ziegler-Natta formed high density polyethylene having a density of 0.952 g/cc, commercially available from TOTAL PETROCHEMICALS USA, Inc. as 2290.

As used herein, Polymer "C" was a high molecular weight bimodal Ziegler-Natta formed high density polyethylene having a density of 0.950 g/cc.

Blown films were formed from the polymer samples and the resultant blown film processes were evaluated for bubble stability. The results of the evaluation follow in Table 1 below. As used herein the bubble stability was evaluated by a stability ranking. Blown films were produced using an Alpine film line with a flat temperature profile of 400° F. The film stability was quantified by producing blown film at three neck heights (30, 37, 44" from die), and a blow-up ratio of 4:1. Stability rankings were recording at each neck heights with the iris closed, and 3 minutes after the iris was fully opened. A numerical ranking of 4 is the highest stability where there are no vertical stability issues (breathing) or bubble dancing. A ranking of 3 indicates slight breathing and dancing (less than 1" deviation from center). A ranking of 2 indicates the bubble is breathing or dancing greater than 1" from center. A ranking of 1 is the lowest ranking where the bubble is exhibiting significant breathing and/or helical rotation all the way to the open iris. A final stability number is calculated by multiplying the data from the three closed rankings and the three open rankings and normalizing using the log scale. The scale for the testing is therefore 0 to 3.61, with 3.61 being the most stable ranking.

TABLE 1

| Run | Polymer | Peroxide level [ppm] | $MI_5$ [dg/min] | Stability ranking |
|---|---|---|---|---|
| 1 (2285) | A | 0 | 0.32 | 2.0 |
| 2 (2290) | B | 11 | 0.27 | 2.5 |
| 3 (2290) | B | 90 | 0.17 | poor drawability |
| 4 (BDM1-05-11) | C | 15 | 0.31 | 1.1 |
| 5 (BDM1-05-11) | C | 30 | 0.28 | 1.6 |
| 6 (BDM1-05-11) | C | 100 | 0.18 | 3.3 |

Unexpectedly, the Ziegler-Natta formed bimodal polyethylene samples formed as described herein (Runs 4-6) resulted in improved bubble stability at higher peroxide concentrations while bubble instability was generally observed with the increased peroxide levels in the other bimodal polyethylene samples. In particular, Sample 6 having a Ziegler-Natta formed bimodal polyethylene and a peroxide concentration of about 100 pm resulted in stability ranking of 3.3 while bubble instability was observed in Sample 3 bimodal polyethylene formed by other methods and a peroxide concentration of about 90 ppm.

The properties of the blown films were further analyzed and are shown in FIG. 1. As illustrated in FIG. 1, the Ziegler-Natta formed bimodal polyethylene unexpectedly exhibited a reduction in transverse direction (TD) tear strength with an increased concentration of peroxide. Accordingly, the addition of the peroxide causes a drop in TD tear strength.

While the foregoing is directed to embodiments of the present invention, other and further embodiments of the invention may be devised without departing from the basic scope thereof and the scope thereof is determined by the claims that follow.

What is claimed is:

1. A process of forming blown film comprising:
providing a bimodal ethylene based polymer, wherein the bimodal ethylene based polymer is formed from a Ziegler-Natta catalyst system, wherein the Ziegler-Natta catalyst system is formed by contacting an alkyl magnesium compound with an alcohol to form a magnesium dialkoxide compound and contacting the magnesium dialkoxide compound with successively stronger chlorinating agents, wherein the bimodal ethylene based polymer exhibits a density of at least about 0.940 g/cc;
blending the bimodal ethylene based polymer with at least 100 ppm peroxide to form modified polyethylene; and
forming the modified polyethylene into a blown film, wherein the modified polyethylene exhibits a stability ranking of at least 2;
wherein the polymer article exhibits a transverse strength that is at least about 85% lower than a polymer article prepared via an identical process absent the peroxide.

2. The process of claim 1, wherein the blown film exhibits at least about a 10% increase in bubble stability than a polymer article prepared via an identical process absent the peroxide.

3. The process of claim 1, wherein the modified polyethylene comprises at least 100 ppm to about 200 ppm peroxide.

4. The process of claim 1, wherein the ethylene based polymer exhibits a ratio of high molecular weight fraction to low molecular weight fraction of from about 80:20 to about 20:80.

5. A blown film formed from the process of claim 1.

6. The process of claim 1, wherein the peroxide comprises an organic peroxide.

7. The process of claim 1, wherein the bimodal ethylene based polymer is blended with 100 ppm to 150 ppm peroxide.

* * * * *